United States Patent
Nemoto et al.

(10) Patent No.: US 7,701,562 B2
(45) Date of Patent: Apr. 20, 2010

(54) METHOD OF MEASURING FRONT AND BACK SURFACES OF TARGET OBJECT

(75) Inventors: Kentaro Nemoto, Kawasaki (JP); Masaoki Yamagata, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 12/379,177

(22) Filed: Feb. 13, 2009

(65) Prior Publication Data

US 2009/0207403 A1 Aug. 20, 2009

(30) Foreign Application Priority Data

Feb. 18, 2008 (JP) .............................. 2008-036245

(51) Int. Cl.
*G01B 9/00* (2006.01)
(52) U.S. Cl. .................... 356/124; 356/123; 356/124.5; 356/127
(58) Field of Classification Search ......... 356/213–236, 356/123–127; 73/597, 602, 618, 625, 706; 338/16, 47; 33/554, 549; 364/556, 506, 364/507
See application file for complete search history.

(56) References Cited

U.S. PATENT DOCUMENTS

| | | | | |
|---|---|---|---|---|
| 5,062,297 A | * | 11/1991 | Hashimoto et al. ............ 73/597 |
| 5,515,298 A | * | 5/1996 | Bicz ............................. 702/167 |
| 5,760,310 A | * | 6/1998 | Rud et al. ....................... 73/706 |
| 6,072,569 A | | 6/2000 | Bowen |
| 6,895,682 B2 | * | 5/2005 | Sohn et al. ..................... 33/554 |
| 7,194,908 B2 | * | 3/2007 | Nenno et al. ................... 73/618 |
| 7,352,271 B2 | * | 4/2008 | Nemoto et al. ................. 338/16 |
| 2006/0209294 A1 | | 9/2006 | Murata |

FOREIGN PATENT DOCUMENTS

| | | |
|---|---|---|
| JP | A-2006-078398 | 3/2006 |
| JP | A-2007-170930 | 7/2007 |
| WO | WO 2007/018118 A1 | 2/2007 |

\* cited by examiner

*Primary Examiner*—Sang Nguyen
(74) *Attorney, Agent, or Firm*—Oliff & Berridge, PLC

(57) ABSTRACT

A method of measuring a front surface profile and a back surface profile of a target object includes: mounting the target object in such a posture that a first measuring surface (front surface) is measurable by a probe; first measuring a contour of the target object; measuring the first measuring surface of the target object; reversing the target object; second measuring the contour of the target object with the reversed posture of the target object being maintained; obtaining a measurement position of a second measuring surface by comparison of contour data obtained through the first and second measuring of the contour, the measurement position of the second measuring surface corresponding to a measurement position of the first measuring surface at which the measuring of the first measuring surface is conducted; and measuring a profile of the second measuring surface along the obtained measurement position of the second measuring surface.

4 Claims, 15 Drawing Sheets

METHOD OF MEASURING FRONT AND BACK SURFACES OF TARGET OBJECT

BACKGROUND OF THE INVENTION

1. Field of the Invention

The present invention relates to a method of measuring front and back surfaces of a target object. For instance, the method according to an aspect of the invention relates to a method of measuring a front surface profile and a back surface profile of a lens.

2. Description of Related Art

When lenses are manufactured through transfer using metal molds, the optical axis of front surfaces of the manufactured lenses may be misaligned with the optical axis of back surfaces of the manufactured lenses, depending on precision and displacement of the metal molds. Such misalignment may hamper achievement of desired optical characteristics.

In view of the above, various proposals have been made on methods of measuring profiles of front and back surfaces of lenses.

For instance, a document 1 (JP-A-2006-78398) discloses a method and a device of measuring eccentricity and inclination of front and back surfaces.

According to the document 1, a target object-holding jig is used, and a lens (target object) and three reference balls are disposed on the target object-holding jig such that the lens and the three reference balls are exposed to front and back surfaces of the target object-holding jig. Three-dimensional profile data of the lens and coordinates of the centers of the reference balls are measured at the front and back surfaces of the target object-holding jig. Then, based on the coordinates of the center of the reference balls, three-dimensional profile data of front and back surfaces of the lens is synthesized, so that eccentricity and inclination between the front surface and the back surface of the lens are obtained from the synthesized data about the front and back surfaces of the lens.

However, since the above-described method requires high-precision balls to be used as the reference balls, preparation of the jig tends to incur high cost.

In addition, the coordinates of the centers of the reference balls are calculated by partially measuring the exposed potions of the reference balls, which may lead to measurement errors.

SUMMARY OF THE INVENTION

An object of the invention is to provide a method of measuring front and back surfaces of a target object highly accurately, efficiently and economically without using reference balls or the like.

A method of measuring a front surface profile and a back surface profile of a target object according to an aspect of the invention is a method in which: the target object has a first measuring surface and a second measuring surface at a front surface and a back surface within a contour; and the front surface profile and the back surface profile of the target object are measured while the target object and a probe are relatively moved, the method including: mounting the target object in such a posture that the first measuring surface of the target object is measurable by the probe; first measuring the contour of the target object while relatively moving the target object and the probe with the posture of the target object set in the mounting of the target object being maintained; measuring a profile of the first measuring surface of the target object while relatively moving the target object and the probe with the posture of the target object set in the mounting of the target object being maintained; reversing the target object to such a posture that the second measuring surface of the target object is measurable by the probe; second measuring the contour of the target object while relatively moving the target object and the probe with the posture of the target object set in the reversing of the target object being maintained; obtaining a measurement position of the second measuring surface by comparing first contour data obtained through the first measuring of the contour with second contour data obtained through the second measuring of the contour, the measurement position of the second measuring surface corresponding to a measurement position of the first measuring surface at which the measuring of the first measuring surface is conducted; and measuring a profile of the second measuring surface of the target object along the obtained measurement position of the second measuring surface while relatively moving the target object and the probe with the posture of the target object set in the reversing of the target object being maintained.

According to the aspect of the invention, the target object is mounted in such a posture that the first measuring surface of the target object is measurable by the probe (mounting step). Then, while the target object and the probe are being relatively moved, the contour of the target object is measured (first contour measuring step) and a profile of the first measuring surface is measured (first-measuring-surface measuring step).

Subsequently, the target object is reversed to such a posture that the second measuring surface of the target object is measurable by the probe (reversing step). Then, while the target object and the probe are being relatively moved, the contour of the target object is measured (second contour measuring step).

At this time, by comparing the first contour data obtained through the first measurement of the contour with the second contour data obtained through the second measurement of the contour, the measurement position of the second measuring surface corresponding to the measurement position of the first measuring surface at which the measurement of the first measuring surface is conducted is obtained (measurement-position computing step). Then, while the target object and the probe are being relatively moved, a profile of the second measuring surface is measured along the obtained measurement position (second-measuring-surface measuring step).

In other words, the measurement position of the second measuring surface corresponding to the measuring position used in the measurement of the first measuring surface of the lens is obtained by comparing the first contour data obtained through the first measurement of the contour with the second contour data obtained through the second measurement of the contour. Thus, without using reference ball or the like, profiles of the front and back surfaces of the target object can be measured. Accordingly, the economic burden incurred from the preparation of the jig can be alleviated, and there is no need to dispose reference balls as well as the target object on a target object-holding jig. Hence, the front and back surfaces of the target object can be highly accurately and efficiently measured. Particularly, since profiles of the front and back surfaces of the lens can be highly accurately measured, displacement and inclination of the optical axis of the lens can be also measured with high accuracy.

Preferably in the method according to the aspect of the invention, the obtaining of the measurement position of the second measuring surface includes: extracting a unique point of the first contour data and a unique point of the second contour data; obtaining a displacement amount of the unique point of the second contour data relative to the unique point of the first contour data; and displacing a measurement position of the second measuring surface by the displacement amount relative to the measurement position of the first measuring surface so as to obtain the measurement position of the second measuring surface.

According to the aspect of the invention, in obtaining the measurement position, the unique point of the first contour data and the unique point of the second contour data are extracted to obtain the displacement amount between the unique points, and the measurement position of the second measuring surface is displaced relative to the measurement position of the first measuring surface by the obtained displacement amount to obtain the measurement position of the second measuring surface. Thus, through considerably simplified processing, the measurement position of the second measuring surface can be obtained.

Preferably in the method according to the aspect of the invention, scanning measurement is conducted during the measuring of the first measuring surface and the measuring of the second measuring surface, the scanning measurement measuring the measuring surfaces of the target object by bringing the probe in to contact with the measuring surfaces at a constant pressure.

According to the aspect of the invention, in measuring the first measuring surface and the second measuring surface, a scanning measurement for measuring the measuring surface of the target object while bringing the probe into contact with the measuring surface at a constant pressure is conducted. Thus, profiles of the measuring surfaces of the target object can be highly accurately measured.

Preferably in the method according to the aspect of the invention, the probe includes: a casing; a base provided to the casing; a stylus provided to the base and having a contact piece; a vibrator for vibrating the stylus; and a sensor element for detecting vibration of the stylus and outputting a detection signal.

According to the aspect of the invention, the vibrator vibrates the stylus, and the vibrating stylus is brought into contact with the front surface of the target object. Since the vibration of the stylus is restrained when the stylus contacts the front surface of the target object, the detection signal from the sensor element is attenuated. Thus, by conducting the measurement while controlling the stylus moving mechanism such that the attenuation amount of the detection signal from the sensor element becomes always constant, a highly accurate measurement can be realized. Particularly, since a vibratory probe is employed, the measurement can be conducted even with a small measuring force, thereby contributing to minimization of influence of external forces on the target object.

DETAILED DESCRIPTION OF PREFERRED EMBODIMENT(S)

<Description of Overall Arrangement (Reference to FIGS. 1 and 2)>

Figure 1:
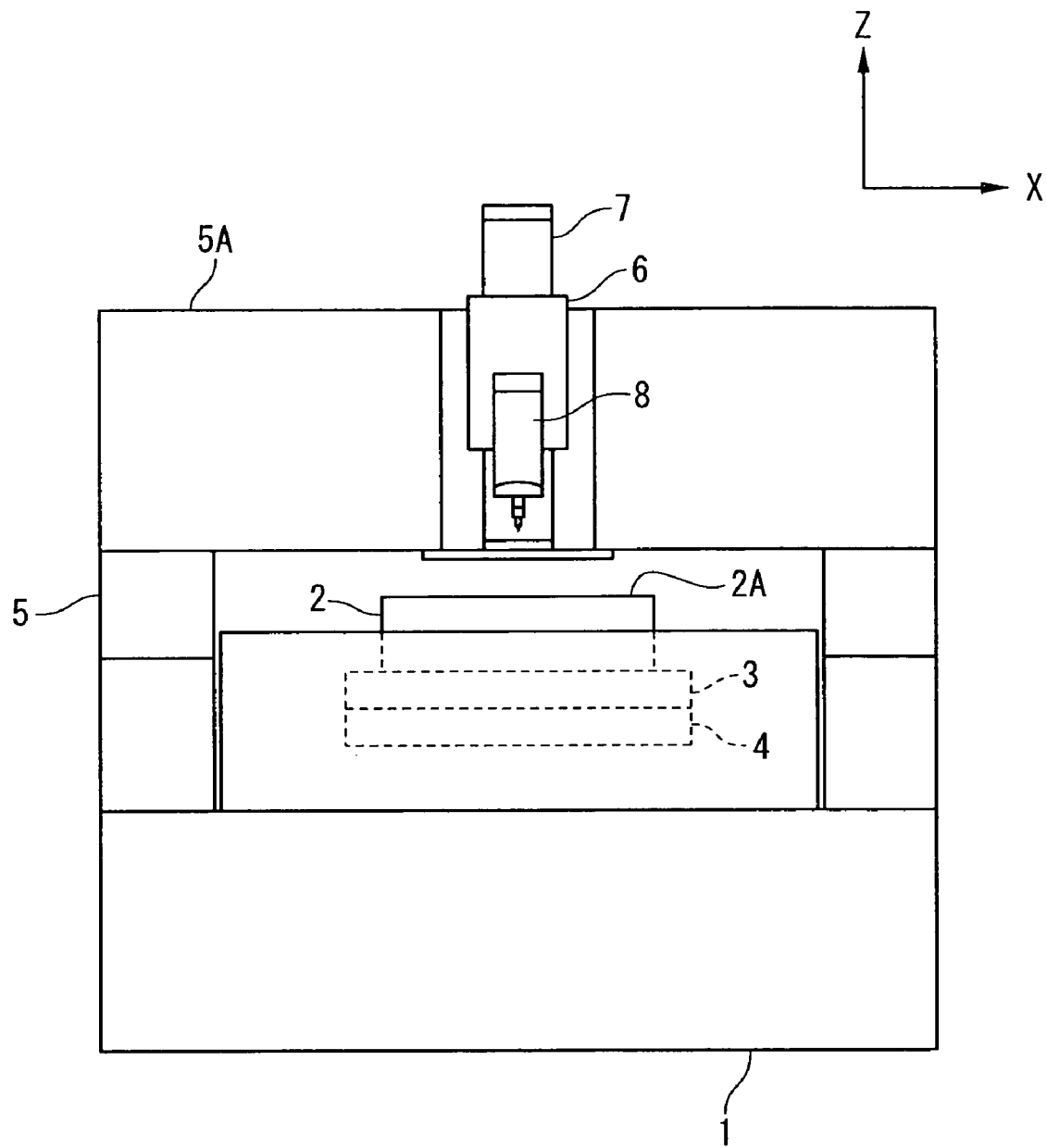
FIG. 1 is a front view showing a surface texture measuring instrument according to an exemplary embodiment.
Figure 2:
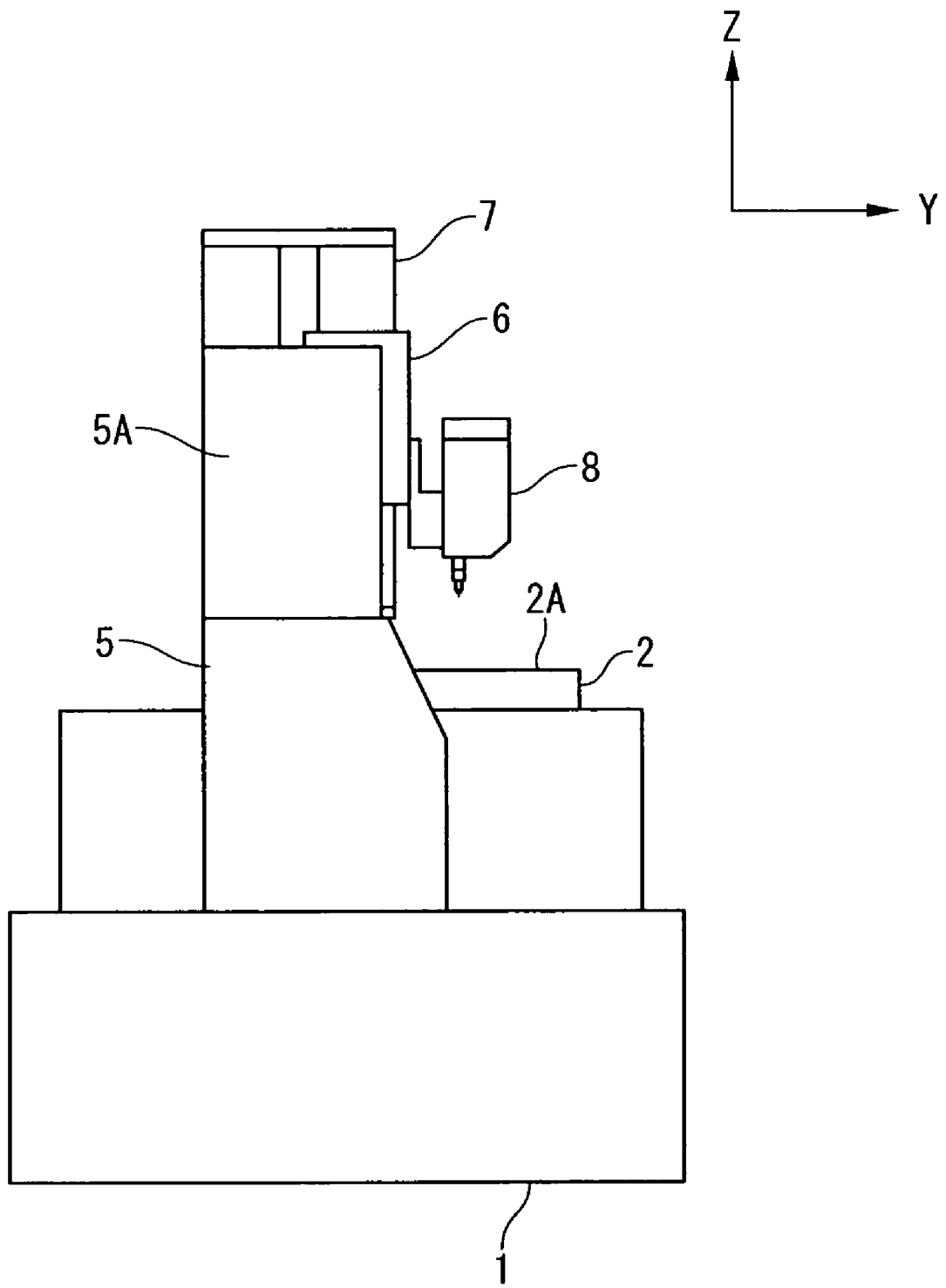
FIG. 2 is a lateral view of the surface texture measuring instrument according to the exemplary embodiment.

FIG. 1 is a front view showing a surface texture measuring instrument for conducting a method according to the invention. FIG. 2 is a lateral view showing the surface texture measuring instrument.

The surface texture measuring instrument includes: a base 1; an XY stage 2 (table) on which a target object is placed; an X-axis driving mechanism 3 and a Y-axis driving mechanism 4 for displacing the XY stage 2 in X-axis and Y-axis directions respectively within a horizontal plane; a portal frame 5 provided over the base 1 in a bridging manner; a Z-axis slider 6 (movable member) provided on a cross rail 5A of the portal frame 5; a Z-axis driving mechanism 7 for displacing the Z-axis slider 6 in a Z-axis direction that is perpendicular to the X-axis and Y-axis directions; and a probe 8 mounted on the Z-axis slider 6.

The XY stage 2, a top face of which includes a flat stage surface 2A on which a target object is placed, is movable in the X-axis and Y-axis directions that are perpendicular to each other within a plane parallel to the stage surface 2A.

The X-axis driving mechanism 3 and the Y-axis driving mechanism 4 each exemplarily include a feed screw mechanism that includes a ball screw shaft and a nut member screwed to the ball screw shaft.

Like the X-axis driving mechanism 3 and the Y-axis driving mechanism 4, the Z-axis driving mechanism 7 also exemplarily includes a feed screw mechanism that includes a ball screw shaft and a nut member screwed to the ball screw shaft.

Figure 3:
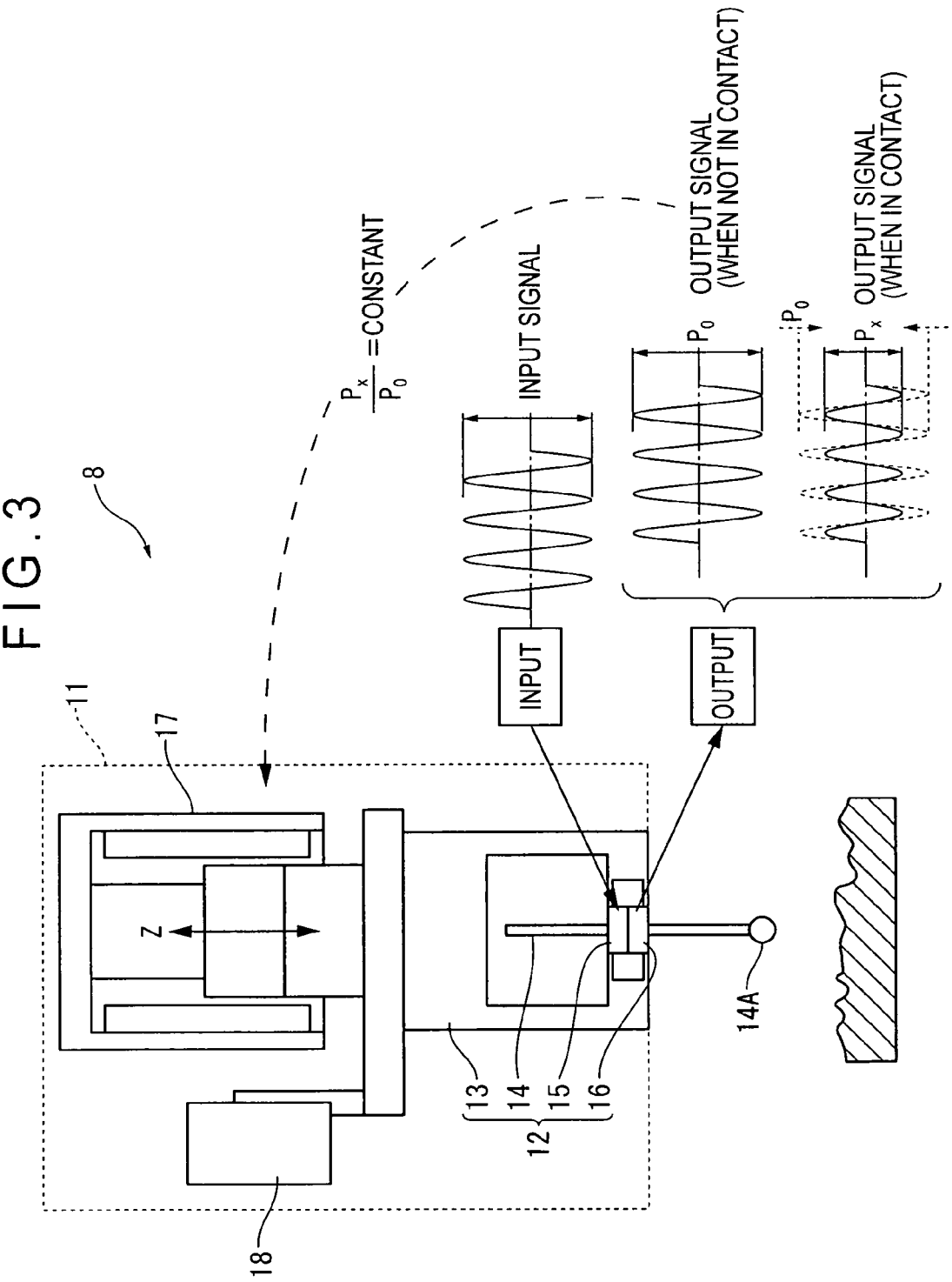
FIG. 3 shows a probe according to the exemplary embodiment.

<Description of Probe 8 (Reference to FIG. 3)>

The probe 8 includes: a casing 11 mounted to the Z-axis slider 6; a sensor 12 provided in the casing 11; a driving actuator 17 (stylus moving mechanism) for displacing the sensor 12 in the Z-axis direction; and a sensor-displacement detector 18 (displacement detector) for detecting a displacement amount of the sensor 12 displaced by the driving actuator 17 (i.e., the displacement amount of the sensor 12 displaced relative to the casing 11). The sensor-displacement detector exemplarily includes a scale and a detection head The sensor 12 includes: a metal base 13; an oscillator 14 (stylus) provided on the base 13 parallely to the Z-axis direction for contacting a surface of a target object; a vibrator 15 for vibrating the oscillator 14 (axially vibrating the oscillator 14); and a sensor element 16 for detecting oscillation of the oscillator 14 and outputting a detection signal. A distal end of the oscillator 14 is adhesively fixed with a contact piece 14A (contact portion) exemplarily formed of diamond chip or ruby. The vibrator 15 and the sensor element 16, which are made of one piece of piezoelectric element, are adhesively fixed to the base 13.

When the vibrator 15 of the sensor 12 is fed with an input signal having a specific frequency and amplitude, the sensor element 16 outputs an output signal having a specific frequency and amplitude.

When the vibrator 15 is fed with an input signal having a specific amplitude at a resonant frequency of the oscillator 14 while the contact piece 14A remains out of contact with the target object, the oscillator 14 is resonated and the sensor element 16 outputs an output signal having an amplitude Po. When the contact piece 14A contacts the target object, the amplitude of the output signal is attenuated from Po to Px.

Accordingly, when the sensor 12 is brought into contact with the target object, a distance between the sensor 12 and the target object is controlled with the driving actuator 17 so that an attenuation rate (Px/Po) becomes always constant. With this arrangement, a profile and roughness of the target object can be measured with a constant measuring force.

Figure 4:
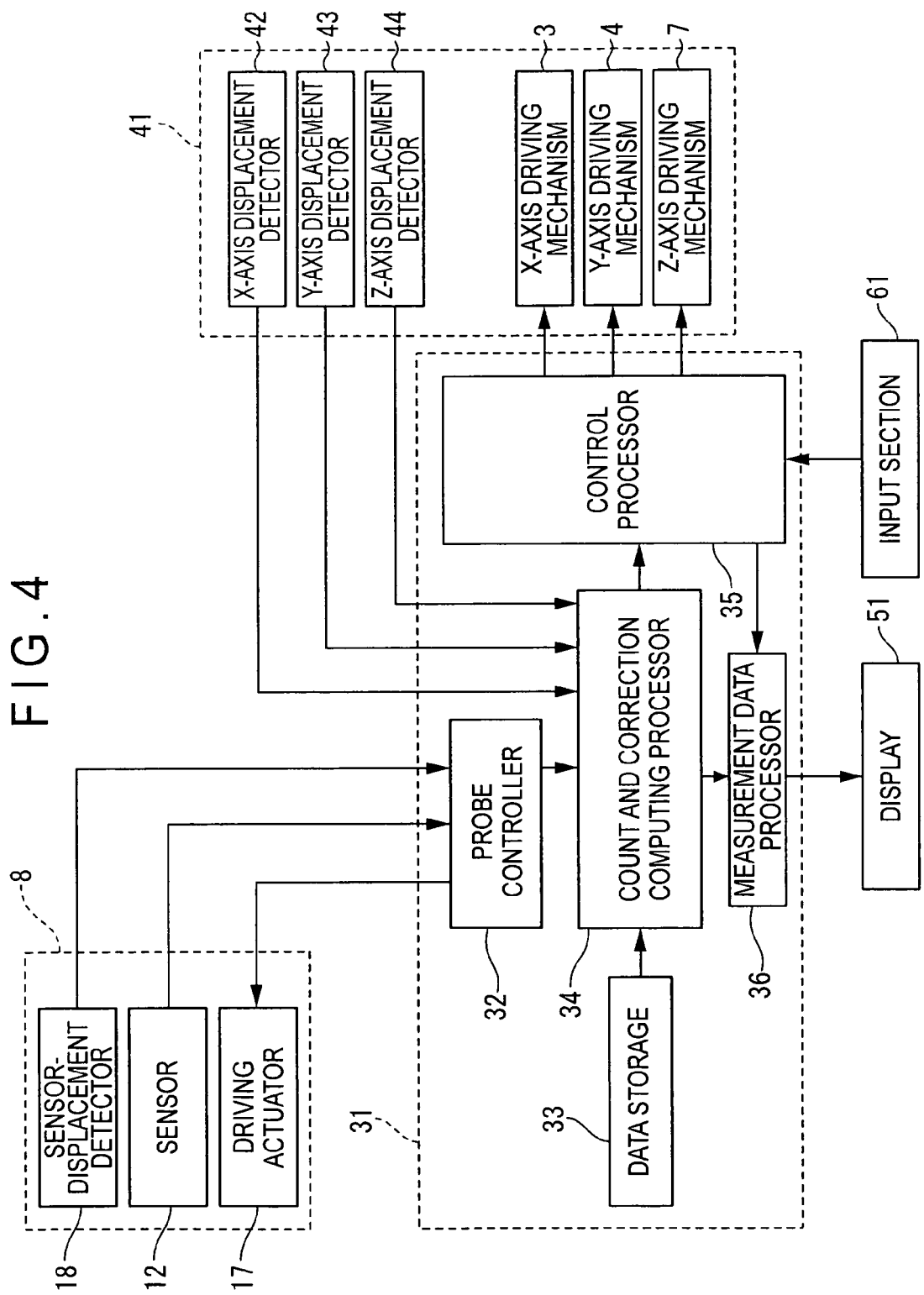
FIG. 4 shows a control system according to the exemplary embodiment.

<Description of Control System (Reference to FIG. 4)>

The control system includes: a controller 31; the probe 8; a driving/displacement detector 41; the display 51; and an input section 61.

The driving/displacement detector 41, in addition to the X-axis driving mechanism 3, the Y-axis driving mechanism 4 and the Z-axis driving mechanism 7, further includes: an X-axis displacement detector 42 and a Y-axis displacement detector 43 for respectively detecting displacement amounts of the XY stage 2 in the X-axis and Y-axis directions; and a Z-axis displacement detector 44 for detecting a displacement amount of the Z-axis slider 6 in the Z-axis direction.

The controller 31 includes: a probe controller 32 for driving the driving actuator 17 at an input of the output signals from the sensor 12 and the sensor-displacement detector 18 of the probe 8; a data storage 33; a count and correction computing processor 34; a control processor 35 for controlling the X, Y and Z-axis driving mechanisms 3, 4 and 7 based on the output from the count and correction computing processor 34; and a measurement data processor 36 for displaying the output from the count and correction computing processor 34 on the display 51.

The data storage 33 stores measurement data obtained through later-described measuring steps such as contour data and profile data of measuring surfaces.

The count and correction computing processor 341 computes a coordinate value of the oscillator 14 from detection values of the X, Y and Z-axis displacement detectors 42, 43 and 44 and the sensor-displacement detector 18. In addition, by comparing the measurement data stored in the data storage 33, specifically by comparing a first contour data of a lens 71 obtained through a later-described first contour measuring step with a second contour data of the lens 71 obtained though a later-described second contour measuring step, the count and correction computing processor 341 obtains a measurement position of a second measuring surface (i.e., lens back surface) corresponding to a measurement position at which a first measuring surface (i.e., lens front surface) has been measured during a first measuring-surface measuring step.

<Description of Method of Measuring Front and Back Surfaces (Reference to FIGS. 5 to 13)>

In this section, an example for measuring a front and back surfaces of a lens (target object) will be described.

Figure 5:
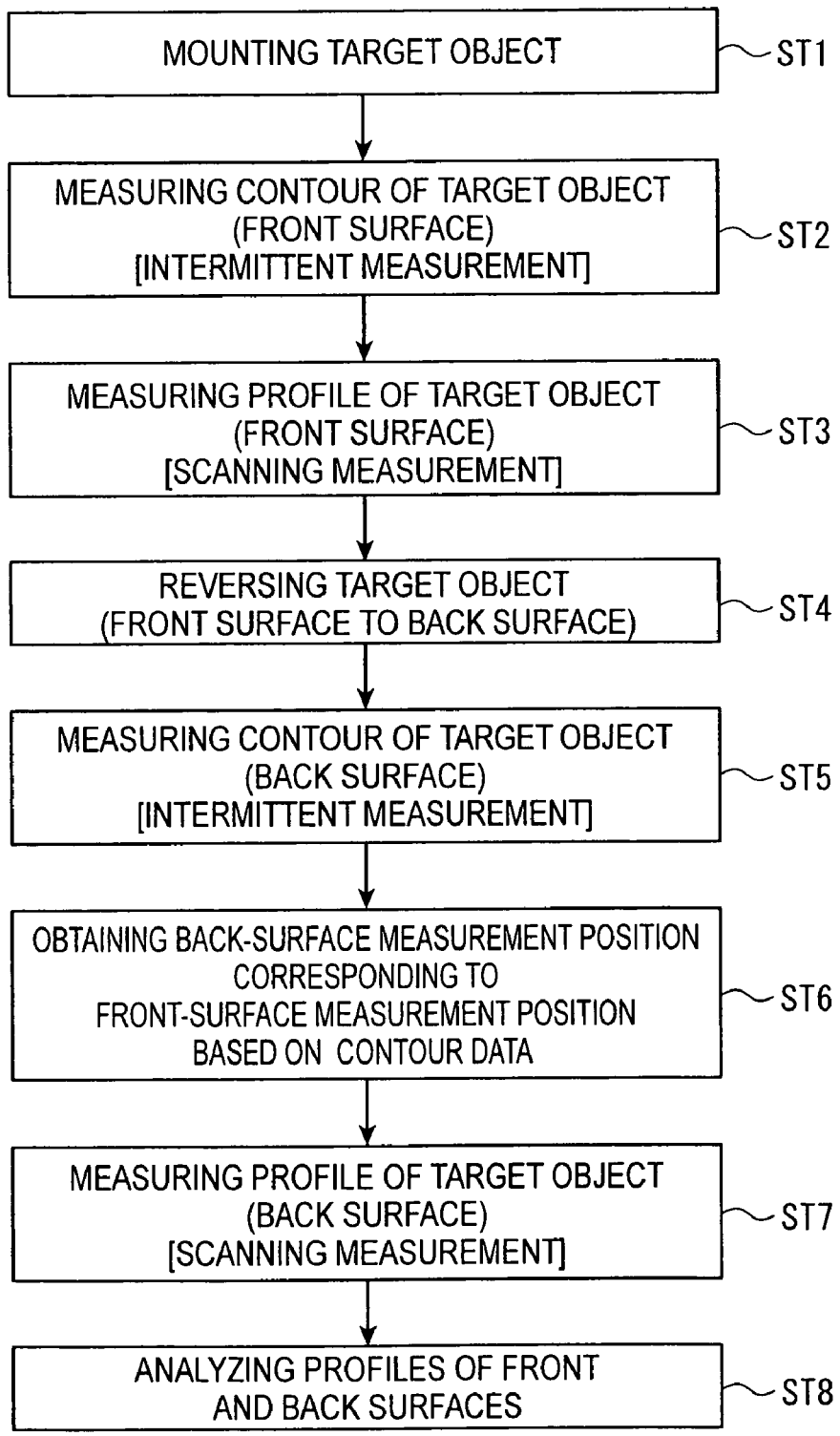
FIG. 5 is a flow chart showing a process of measuring a front surface and a back surface according to the exemplary embodiment.

For measuring the front and back surfaces of the lens, each step shown in FIG. 5 is conducted in accordance with the flow chart shown in FIG. 5.

(ST1) Mounting Step

Figure 6:
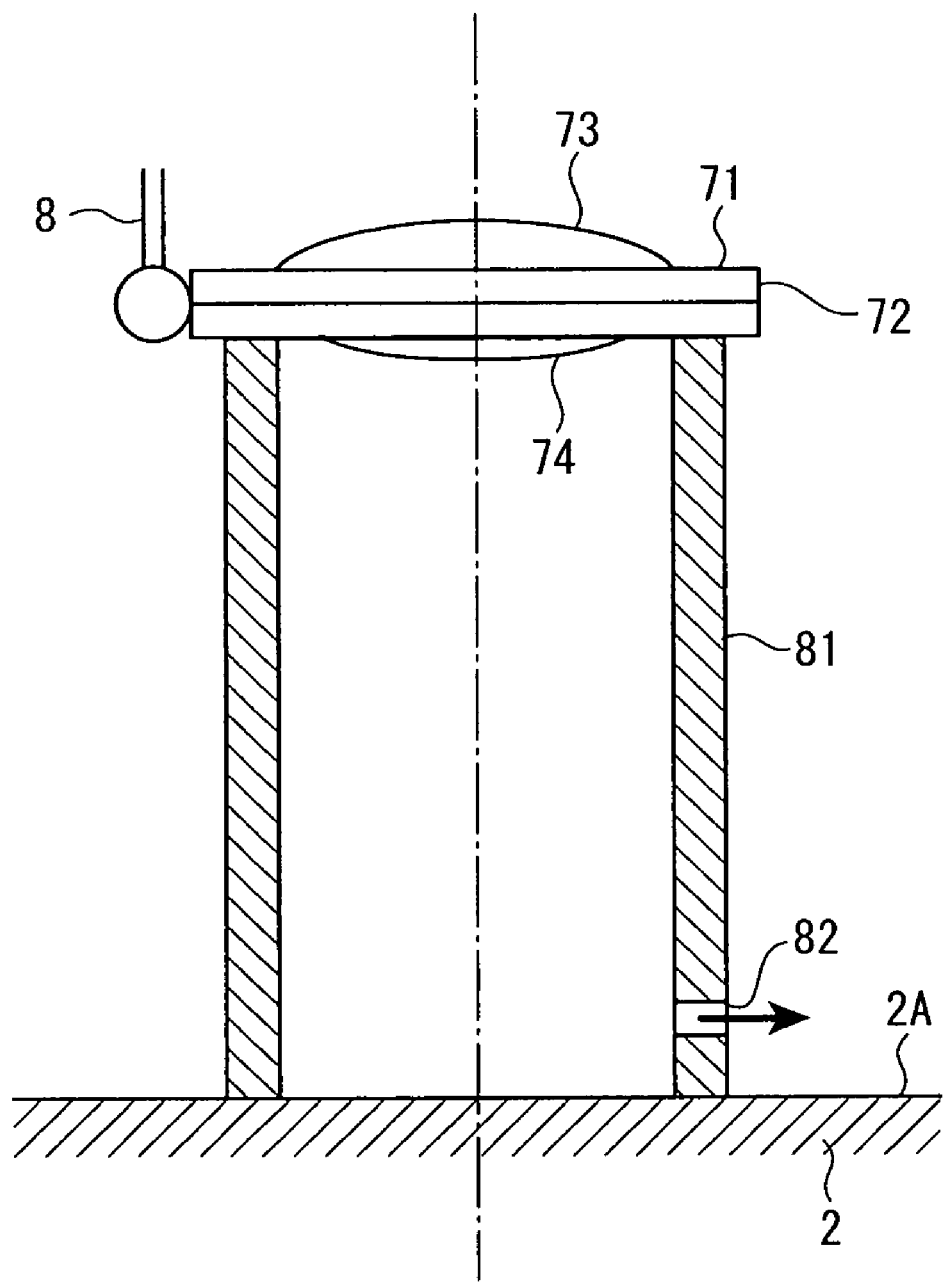
FIG. 6 shows a mounting step according to the exemplary embodiment.

As shown in FIG. 6, the lens 71 (target object) is mounted on the XY stage 2 via a jig 81. The jig 81, which is cylindrically shaped, has an air vacuum hole 82 at its lateral wall for connection with, for instance, a vacuum pump (not shown). By suctioning air from the air vacuum hole 82, the lens 71 is suctioned and held to a top end surface of the jig 81.

The lens 71, which is exemplarily molded by metal mold transfer, has a convex first measuring surface 73 and a convex second measuring face 74 respectively at a front surface and a back surface within a substantially circular contour 72. The lens 71 is mounted so that the first measuring surface 73 comes upward. In other words, the lens 71 is mounted in such a posture that the first measuring surface 73 is measurable by the probe 8.

(ST2) First Contour Measuring Step

Figure 7:
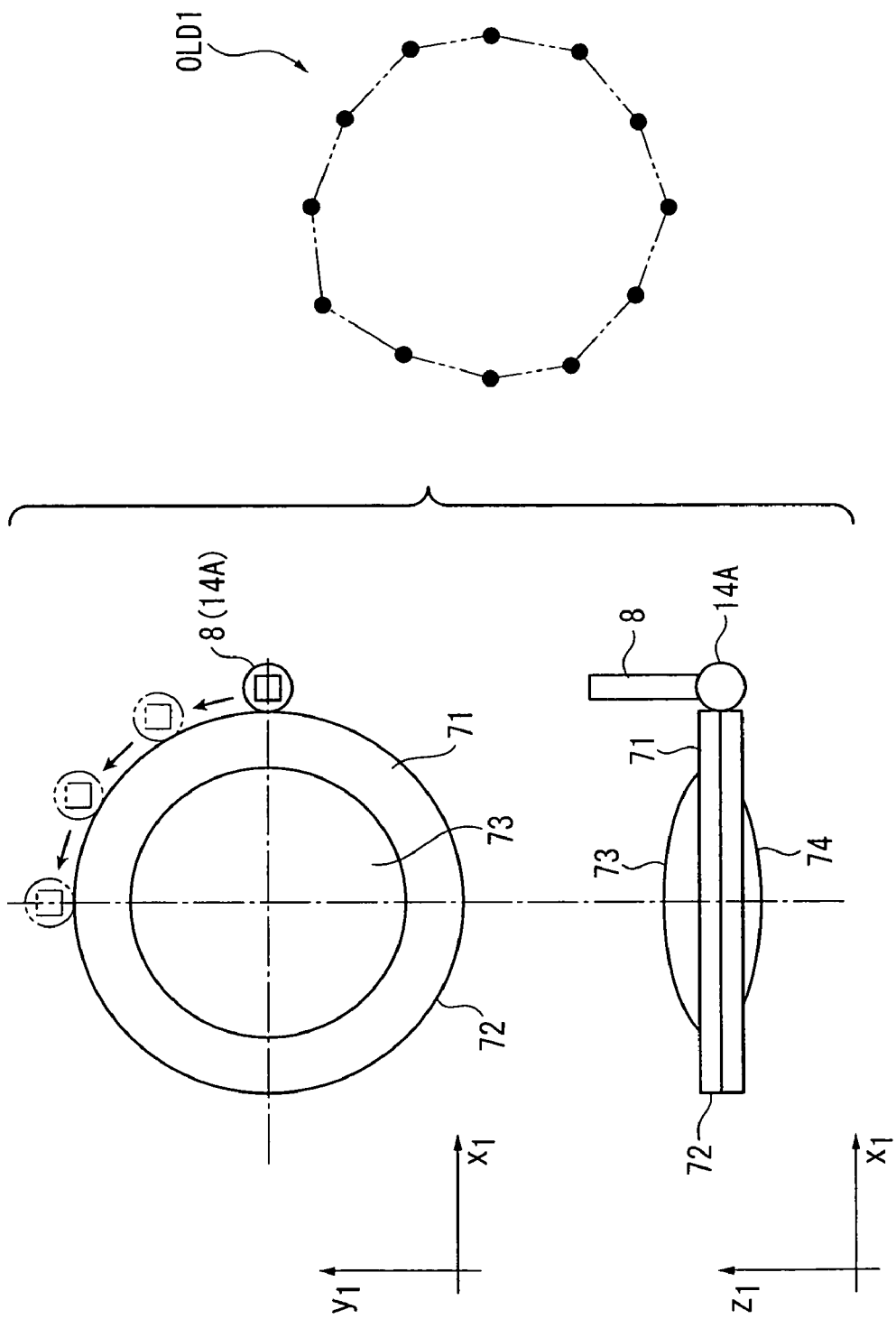
FIG. 7 shows a first contour measuring step according to the exemplary embodiment.

As shown in FIG. 7, while the lens 71 and the probe 8 are being relatively moved with the posture of the lens 71 maintained the same as in the mounting step, the contour 72 of the lens 71 is measured. In this step, while the XY stage 2 is being displaced in the X-axis and Y-axis directions by driving the X-axis driving mechanism 3 and the Y-axis driving mechanism 4, the contact piece 14A of the probe 8 is brought into contact with the lens 71 along the contour 72 of the lens 71 at regular intervals for intermittent measurement. First contour data OLD1 obtained through this step is stored in the data storage 33.

(ST3) First-Measuring-Surface Measuring Step

Figure 8:
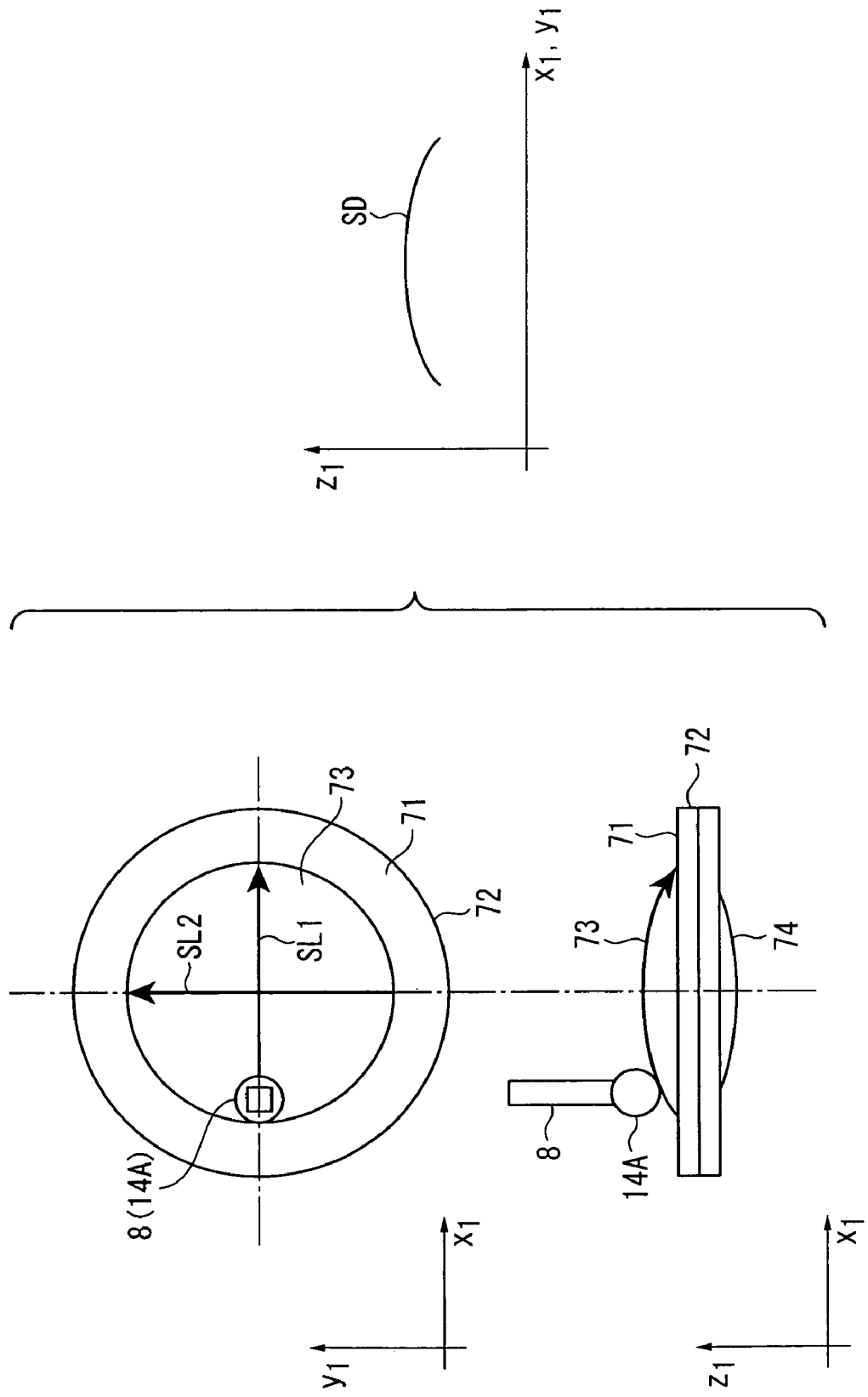
FIG. 8 shows a first-measuring-surface measuring step according to the exemplary embodiment.

As shown in FIG. 8, while the lens 71 and the probe 8 are being relatively moved with the posture of the lens 71 maintained the same as in the mounting step, the first measuring surface 73 of the lens 1 is measured. In this step, while the contact piece 14A of the probe 8 is in contact with the first measuring surface 73 at a constant pressure, the XY stage 2 and the probe 8 are relatively moved along measurement lines SL1 and SL2 respectively extending in the X-axis direction and the Y-axis direction for scanning measurement. Profile data SD of the first measuring surface obtained through this step is stored in the data storage 33.

(ST4) Reversing Step

Figure 9:
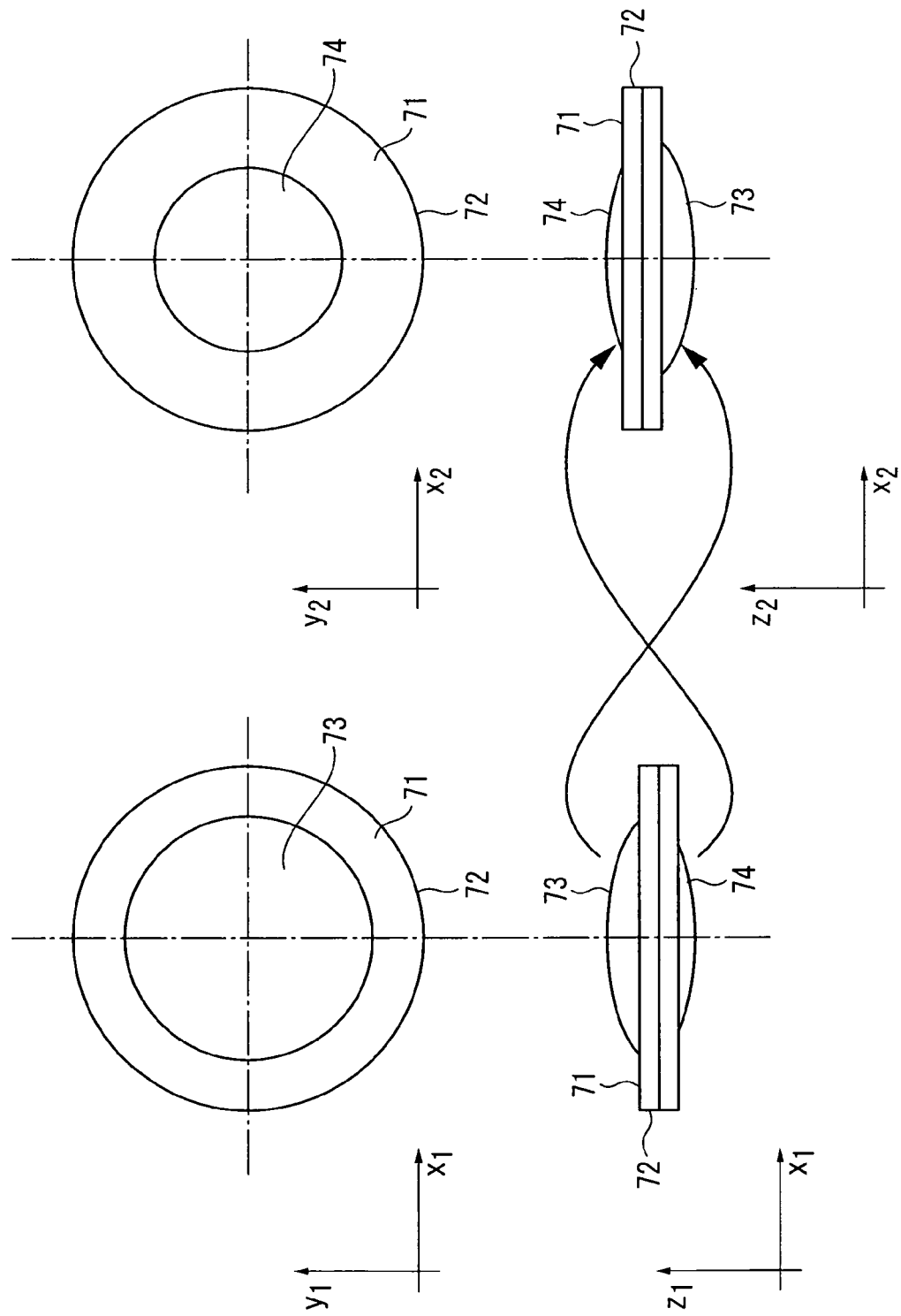
FIG. 9 shows a reversing step according to the exemplary embodiment.

As shown in FIG. 9, the lens 71 is reversed to such a posture that the second measuring surface 74 of the lens 71 become measurable by the probe 8 and mounted in this posture. In other words, the lens 71 is reversed so that the second measuring surface 74 of the lens 71 comes upward, and mounted on the jig 81.

(ST5) Second Contour Measuring Step

Figure 10:
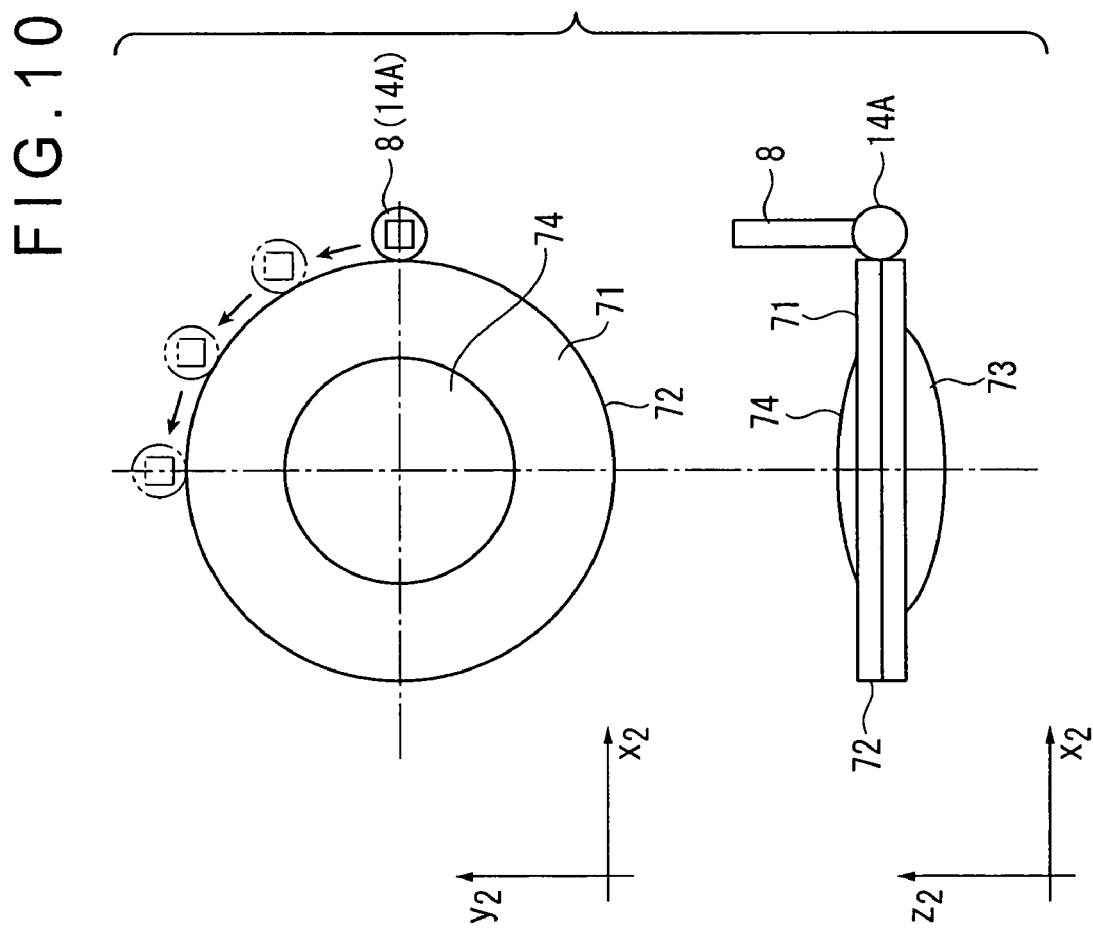
FIG. 10 shows a second contour measuring step according to the exemplary embodiment.

As shown in FIG. 10, while the lens 71 and the probe 8 are being relatively moved with the posture of the lens 71 maintained the same as in the reversing step, the contour of the lens 71 is measured. In this step, while the XY stage 2 is being displaced in the X-axis and Y-axis directions by driving the X-axis driving mechanism 3 and the Y-axis driving mechanism 4, the contact piece 14A of the probe 8 is brought into contact with the lens 71 along the contour 72 of the lens 71 at regular intervals for intermittent measurement. Second contour data OLD2 obtained through this step is stored in the data storage 33.

(ST6) Measurement-Position Computing Step

Figure 11:
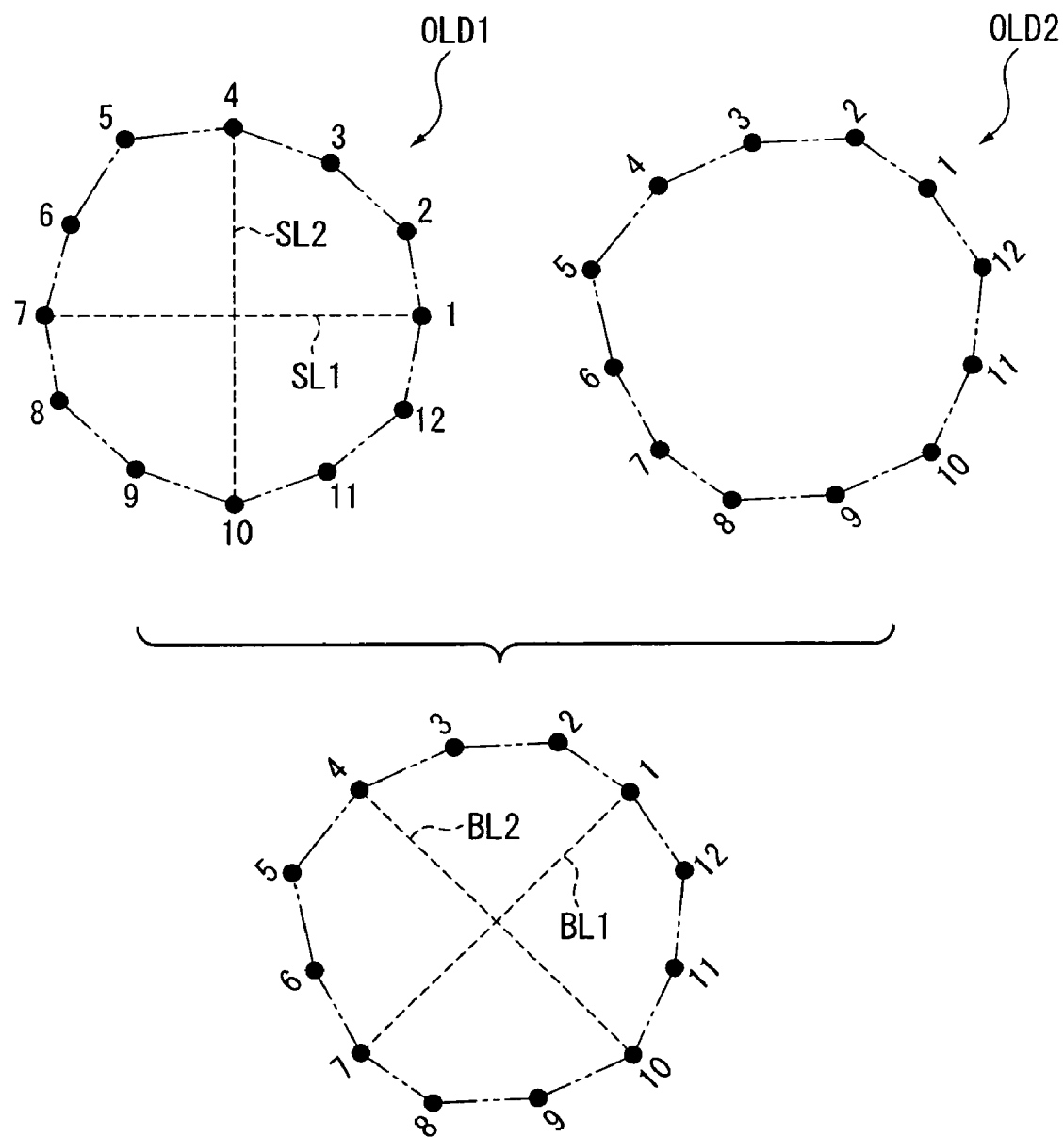
FIG. 11 shows a measurement-position computing step according to the exemplary embodiment.

As shown in FIG. 11, by comparing the first contour data OLD1 obtained through the first contour measuring step with the second contour data OLD2 obtained through the second contour measuring step, measurement lines (measurement position) of the second measuring surface 74 which correspond to the measurement lines SL1, SL2 (measurement position) of the first measuring surface 73 at which the first-measuring-surface measuring step is conducted are obtained.

Specifically, by extracting unique points common between the first contour data ODL 1 and the second contour data OLD2, a displacement amount (rotary amount) of the unique points of the second contour data OLD2 relative to the unique points of the first contour data OLD1 is obtained. Then, measurement lines of the second measuring surface 74 are displaced by its displacement amount (rotary angle) relative to the measurement lines SL1, SL2 of the first measuring surface 73, and measurement lines BL1, BL2 of the second measuring surface 74 are obtained.

(ST7) Second-Measuring-Surface Measuring Step

Figure 12:
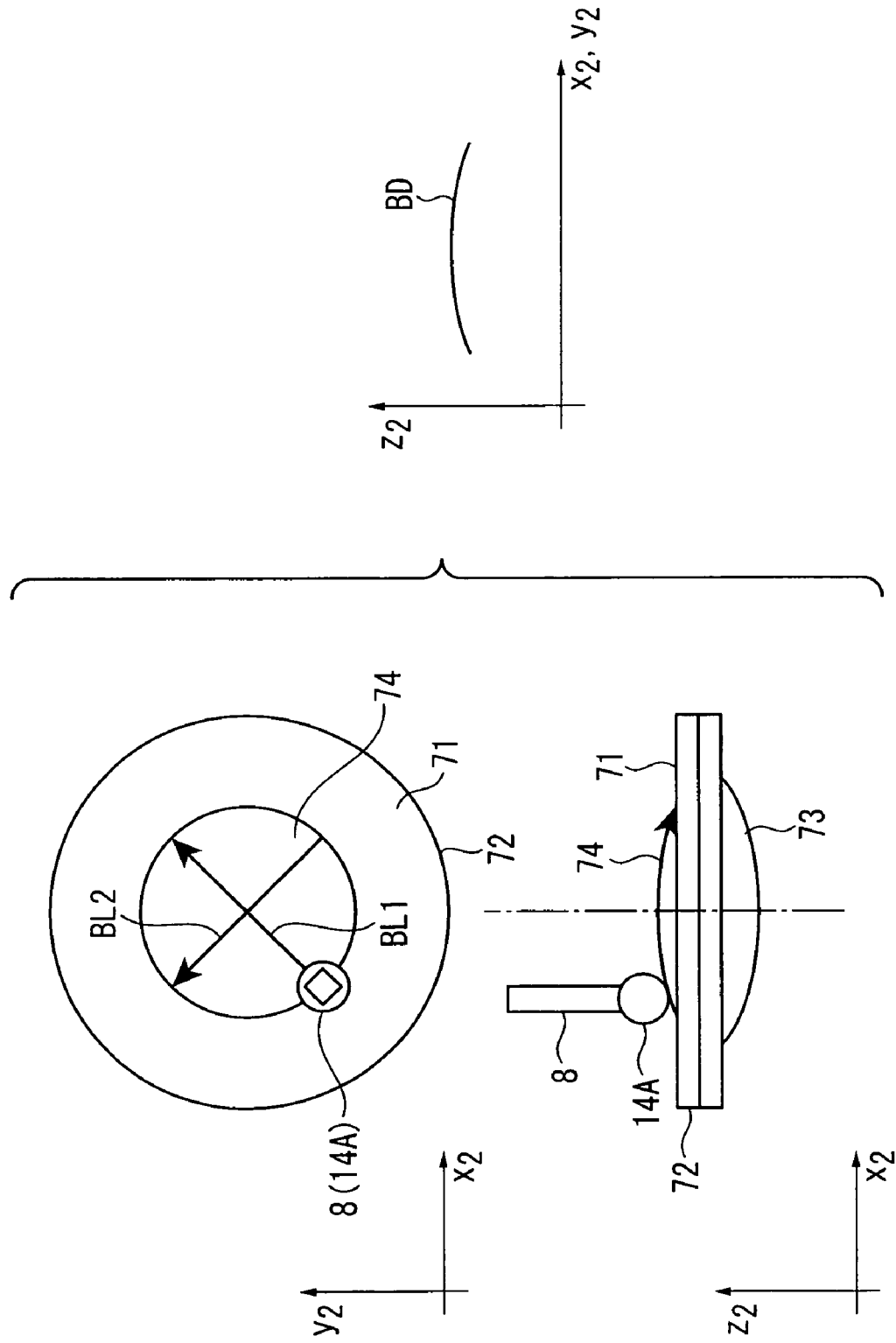
FIG. 12 shows a second-measuring-surface measuring step according to the exemplary embodiment.

As shown in FIG. 12, while the lens 71 and the probe 8 are being relatively moved with the posture of the lens 71 maintained the same as in the reversing step, the second measuring surface 74 is measured along the measurement lines BL1, BL2 obtained through the measurement-position computing step. In this step, while the contact piece 14A of the probe 8 is in contact with the second measuring surface 74 at a constant pressure, the XY stage 2 and the probe 8 are relatively moved along measurement lines BL1 and BL2 for scanning measurement. Profile data BD of the second measuring surface obtained through this step is stored in the data storage 33.

(ST8) Profile Analyzing Step

Figure 13:
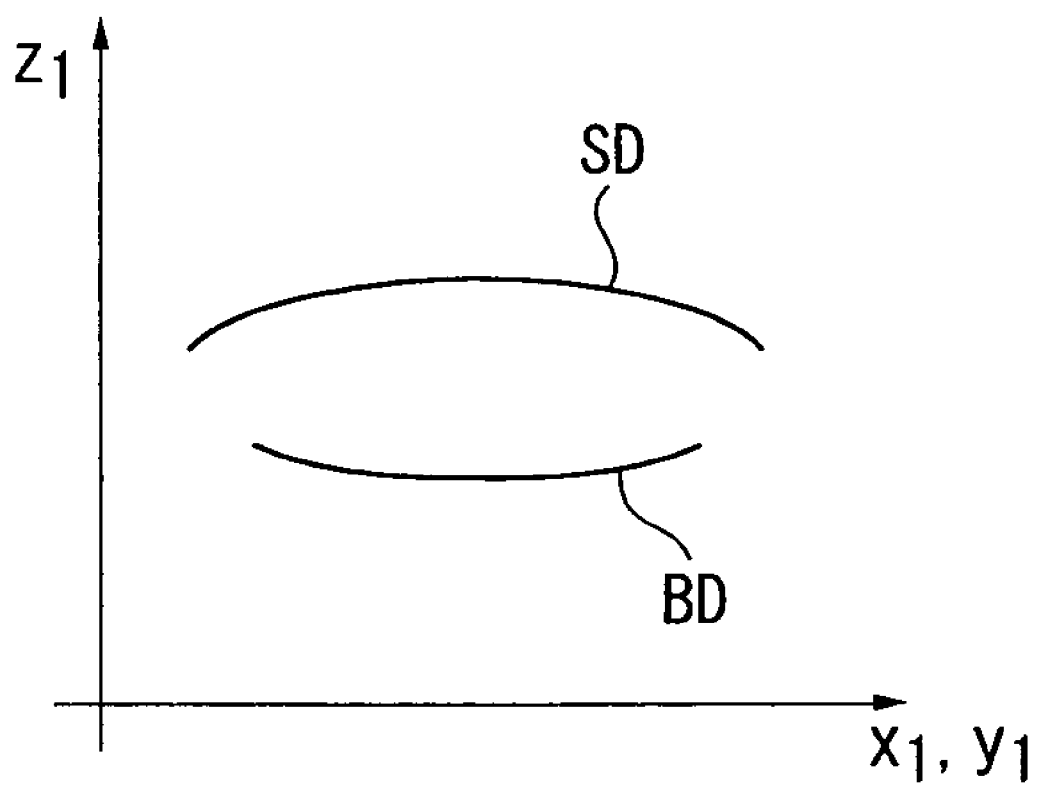
FIG. 13 shows a profile analyzing step according to the exemplary embodiment.

By reversing the profile data BD of the second measuring surface among the profile data SD of the first measuring surface and the profile data BD of the second measuring surface stored in the data storage 33, the profile data SD of the first measuring surface and the profile data BD of the second measuring surface of the lens 71 are obtained as shown in FIG. 13. From the data, displacement or inclination of the optical axis at the front surface and back surface of the lens 71 can be measured.

EFFECT(S) OF EXEMPLARY EMBODIMENT

According to this exemplary embodiment, the measurement lines BL1, BL2 of the second measuring surface 74 corresponding to the measurement lines SL1, SL2 used in the measurement of the first measuring surface 73 of the lens 71 are obtained by comparing the first contour data OLD1 obtained through the first contour measuring step with the second contour data OLD2 obtained through the second contour measuring step. Thus, without using reference ball, profiles of the front and back surfaces of the lens 71 can be measured with high accuracy and efficiency. Therefore, displacement or inclination of the optical axis of the lens 71 can be also measured with high accuracy.

Particularly, when the measurement lines BL1, BL2 of the second measuring surface 74 corresponding to the measurement lines SL1, SL2 of the first measuring surface 73 are obtained, the unique points common between the first contour data OLD1 and the second contour data OLD2 are extracted, and the displacement amount of the unique points are obtained. Then, the measurement position of the second measuring surface 74 is displaced relative to the measurement lines SL1, SL2 of the first measuring surface 73 by its displacement amount, so that the measurement lines BL1, BL2 of the second measuring surface 74 are obtained. Thus, with considerably simplified processing, the measurement position of the second measuring surface 74 can be obtained.

<Modification>

The invention is not limited to the above-described exemplary embodiment but may include modification(s) and improvement(s) made within a scope where an object of the invention can be attained.

While the lens 71 is suctioned and held onto the XY stage 2 by use of the cylindrical jig 81 in the above exemplary embodiment, the invention is not limited thereto.

Figure 14:
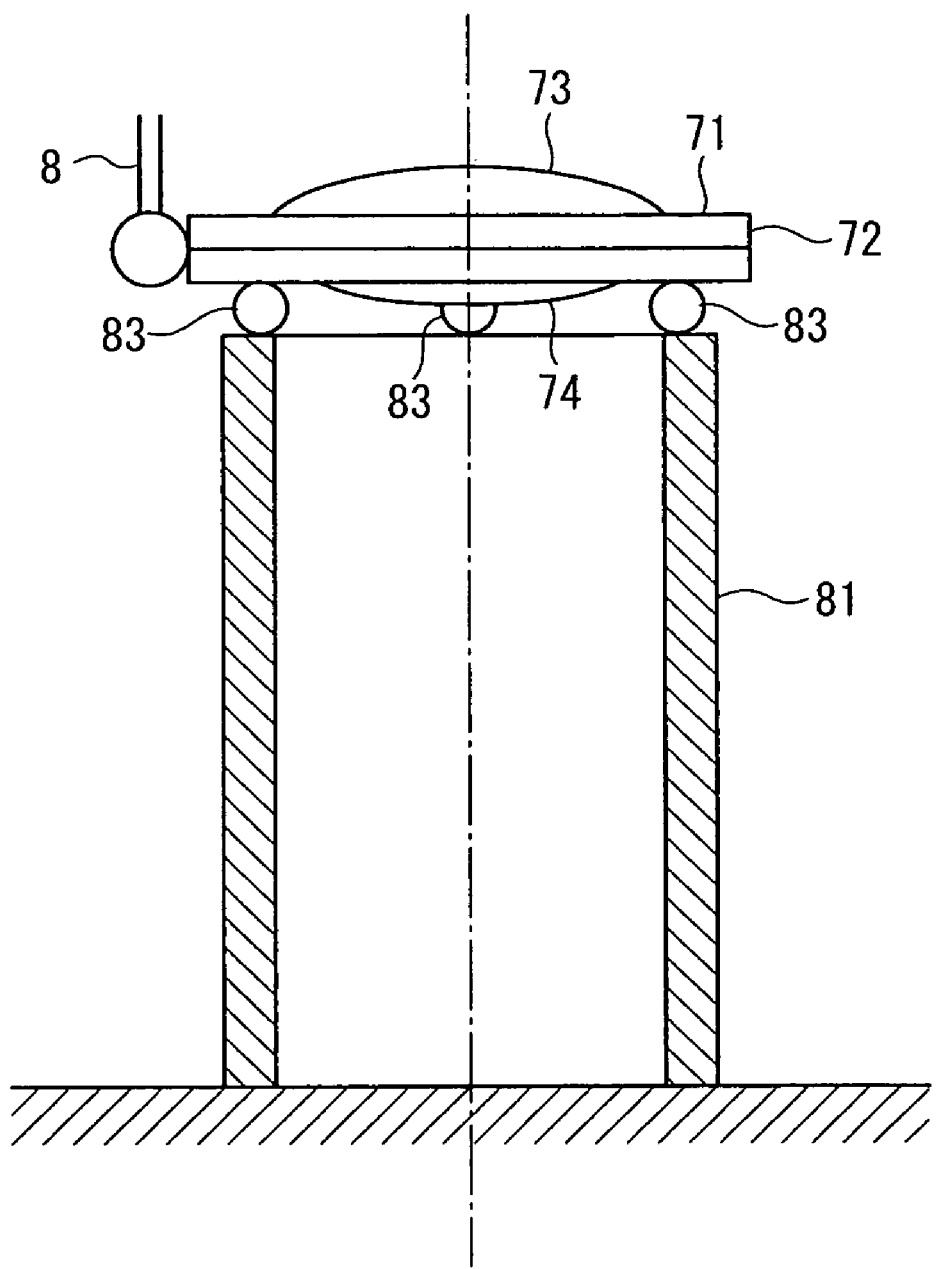
FIG. 14 shows another example of a jig.

As exemplarily shown in FIG. 14, three steel balls 83 may be placed on the top end surface of a cylindrical jig 81 having no air vacuum hole every 120 degrees, so that the lens 71 may be placed on the three steel balls 83. Since the probe 8 used in this exemplary embodiment can perform measurement even when the measuring force is considerably small, the probe 8 can measure the lens 71 without displacing the lens 71 even when the lens 71 is simply placed on the three steel balls.

Figure 15:
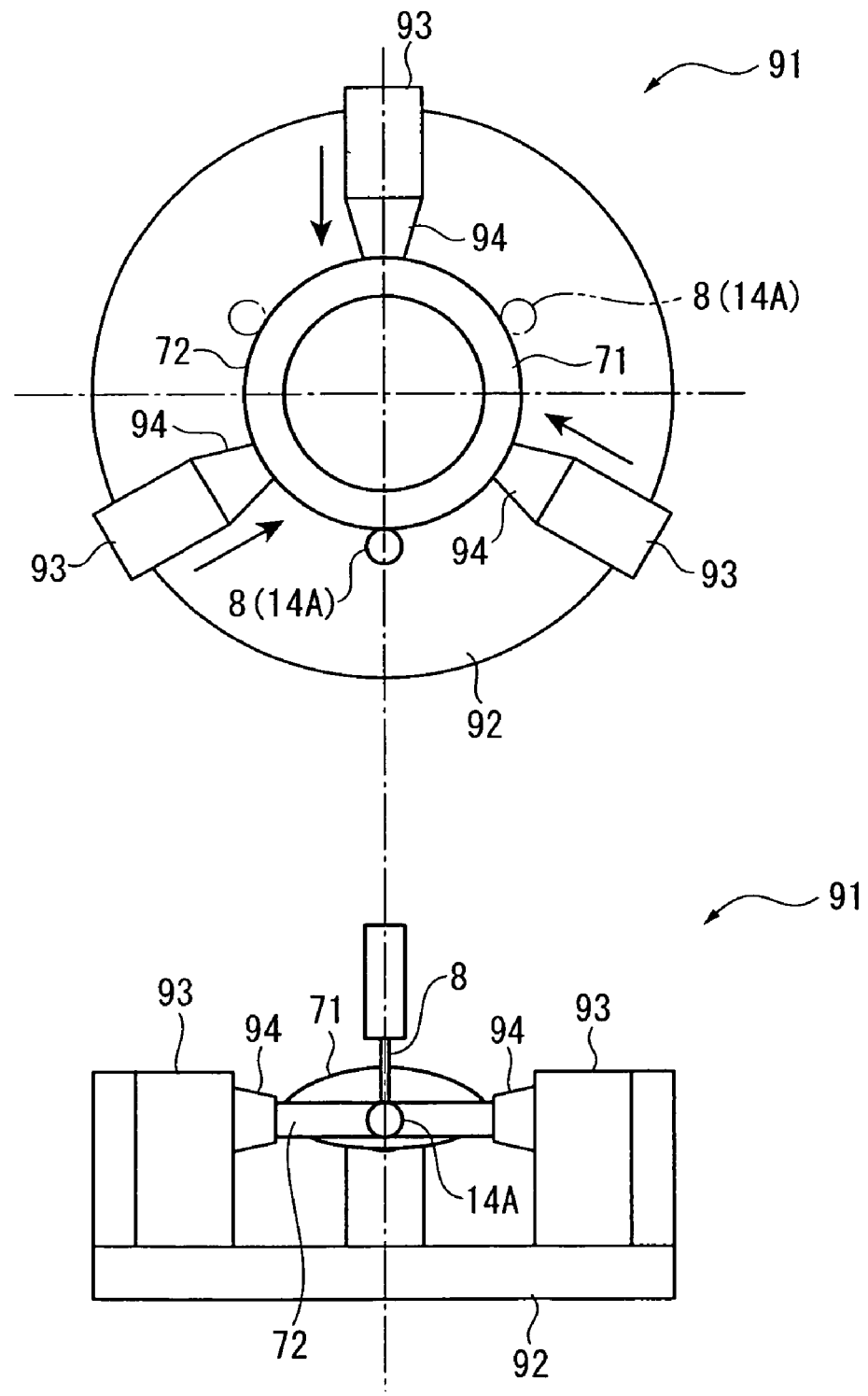
FIG. 15 shows a still further example of the jig.

Alternatively, as shown in FIG. 15, a jig 91 having a chuck mechanism for pinching the contour 72 of the lens 71 may be used. The jig 91 includes: a substrate 92; three pinching nails 93 disposed on the substrate 92 concentrically every 120 degrees and adapted to be advanced toward and retracted from the center; and elastic contacts 94 such as rubber mounted on distal ends of the pinching nails 93. In measurement, the contact piece 14A of the probe 8 is brought into contact with the contour 72 of the lens 71 from between the three pinching nails 93.

While the front surface profile of the lens 71 is described by exemplifying the first measuring surface 73 and the back surface profile of the lens 71 is described by exemplifying the second measuring surface 74 in the above exemplary embodiment, the first measuring surface 73 and the second measuring surface 74 may be vise versa. In other words, the back surface profile of the lens 71 may correspond to the first measuring surface while the front surface profile may correspond to the second measuring surface.

While the vibratory scanning probe 8 is used in the above exemplary embodiment, the invention is not limited thereto. For instance, a structure for detecting displacement of the oscillator generated when the contact piece 14A contacts the target object may be employed. Alternatively, a structure for detecting distortion of the oscillator 14 generated when the contact piece 14A contacts the target object may be employed.

While the XY stage 2 is movable in the X-axis direction and the Y-axis direction in the above exemplary embodiment, the XY stage 2 and the Z-axis slider 6 (movable member) may be adapted to be relatively displaced in the X and Y-axis directions perpendicular to each other within a horizontal plane. For instance, the stage 2 may be adapted to be displaced in the Y-axis direction while the Z-axis slider 6 may be adapted to be displaced in the X-axis and Z-axis directions.

While the method of measuring the front and back surfaces of the lens 71 has been described in the above exemplary embodiment, the invention is not limited thereto. The invention is applicable to objects of any other profile, as long as such object has a first measuring surface and a second measuring surface at front and back surfaces within its contour and as long as such object requires that a measurement position at which the first measuring surface is measured be in correspondence with a measurement position at which the second measuring surface is measured.

While the perpendicularly-crossed lines SL1, SL2 are used as the measurement lines for the first measuring surface 73 and the second measuring surface 74 in the above exemplary embodiment, the invention is not limited thereto. For instance, the measurement lines may be a plurality of parallel lines (raster scan) or may be a unicursal or traversable measurement line (vector scan) such as spiral volute.

While the intermittent measurement for measuring the contour of the lens 71 at regular intervals is conducted in the first contour measuring step and the second contour measuring step, the invention is not limited to such intermittent measurement. For instance, a continuous measurement (scanning measurement) may be conducted.

While the contour of the lens 71 measured in the first contour measuring step and the second contour measuring step is circular in the above exemplary embodiment, the invention is not limited thereto. For instance, by gradually changing a height of the probe every time one circular cross section is measured so as to measure a plurality of cross sections of the contour of the lens 71, a cylindrical contour or a conical contour may be measured.

Alternatively, when the lens 71 has a unique contour, for instance, when the contour includes a D-shaped portion in cross section, only such a D-shaped portion may be measured as a line profile or a surface profile in place of the entire contour during the first contour measuring step and the second contour measuring step.

The entire disclosure of Japanese Patent Application No. 2008-036245, filed Feb. 18, 2008, is expressly incorporated by reference herein.

What is claimed is:

1. A method of measuring a front surface profile and a back surface profile of a lens, the lens having a first measuring surface and a second measuring surface at a front surface and a back surface within a contour, the front surface profile and the back surface profile of the lens being measured while relatively moving the lens and a probe, the method comprising:

mounting the lens in such a posture that the first measuring surface of the lens is measurable by the probe;

first measuring the contour of the lens while relatively moving the lens and the probe with the posture of the lens set in the mounting of the lens being maintained;

measuring a profile of the first measuring surface of the lens while relatively moving the lens and the probe with the posture of the lens set in the mounting of the lens being maintained;

reversing the target object to such a posture that the second measuring surface of the lens is measurable by the probe;

second measuring the contour of the lens while relatively moving the lens and the probe with the posture of the lens set in the reversing of the lens being maintained;

obtaining a measurement position of the second measuring surface by comparing first contour data obtained through the first measuring of the contour with second contour data obtained through the second measuring of the contour, the measurement position of the second measuring surface corresponding to a measurement position of the first measuring surface at which the measuring of the first measuring surface is conducted;

measuring a profile of the second measuring surface of the lens along the obtained measurement position of the second measuring surface while relatively moving the lens and the probe with the posture of the lens set in the reversing of the lens being maintained; and analyzing the surface profiles of the lens by obtaining a displacement and inclination of an optical axis of the first measuring surface and the second measuring surface of the lens based on the first contour data obtained in the first measuring and the second contour data obtained in the second measuring.

2. The method according to claim 1, wherein the obtaining of the measurement position of the second measuring surface comprises:

extracting a unique point of the first contour data and a unique point of the second contour data;

obtaining a displacement amount of the unique point of the second contour data relative to the unique point of the first contour data; and displacing a measurement position of the second measuring surface by the displacement amount relative to the measurement position of the first measuring surface so as to obtain the measurement position of the second measuring surface.

3. The method according to claim 1, wherein scanning measurement is conducted during the measuring of the first measuring surface and the measuring of the second measuring surface, the scanning measurement measuring the measuring surfaces of the lens by bringing the probe in to contact with the measuring surfaces at a constant pressure.

4. The method according to claim 1, wherein the probe comprises: a casing; a base provided to the casing; a stylus provided to the base and having a contact piece; a vibrator for vibrating the stylus; and a sensor element for detecting vibration of the stylus and outputting a detection signal.

* * * * *